United States Patent [19]

Witte

[11] Patent Number: 5,318,146
[45] Date of Patent: Jun. 7, 1994

[54] ELECTRIC CIRCUIT FOR ACTIVATING AN OCCUPANT SAFETY DEVICE IN AN AUTOMOTIVE VEHICLE

[75] Inventor: Bastian Witte, Braunschweig, Fed. Rep. of Germany

[73] Assignee: Volkswagen AG, Wolfsburg, Fed. Rep. of Germany

[21] Appl. No.: 3,795

[22] Filed: Jan. 13, 1993

[30] Foreign Application Priority Data

Jan. 24, 1992 [DE] Fed. Rep. of Germany ....... 4201889

[51] Int. Cl.$^5$ ............................................. B60K 28/12
[52] U.S. Cl. .................................. 180/286; 180/282; 280/735; 280/803
[58] Field of Search ..................... 180/286, 283, 282; 280/735, 803

[56] References Cited

U.S. PATENT DOCUMENTS

| 4,302,030 | 11/1981 | Clay | 180/282 |
| 4,688,825 | 8/1987 | Arbogast et al. | 180/286 |
| 4,796,916 | 1/1989 | Rogers et al. | 280/803 |

FOREIGN PATENT DOCUMENTS

| 2142557 | 3/1973 | Fed. Rep. of Germany | 180/286 |
| 2934749 | 3/1981 | Fed. Rep. of Germany | 180/286 |

*Primary Examiner*—Eric Culbreth
*Attorney, Agent, or Firm*—Brumbaugh, Graves, Donohue & Raymond

[57] ABSTRACT

An electric activating circuit for an occupant safety device in an automotive vehicle contains an acceleration sensor arranged in a vehicle door and a door switch for interrupting the electric circuit if the door is open.

3 Claims, 2 Drawing Sheets

ELECTRIC CIRCUIT FOR ACTIVATING AN OCCUPANT SAFETY DEVICE IN AN AUTOMOTIVE VEHICLE

BACKGROUND OF THE INVENTION

This invention relates to electric circuits for activating an occupant safety device responsive to an acceleration sensor in an automotive vehicle.

It is well known to activate a safety device such as a safety-belt tightener or an airbag, for example, only when a collision of the vehicle with another vehicle or an obstacle occurs. As a rule, acceleration sensors are used to detect such collisions by responding to the deceleration of the vehicle upon impact with the obstacle and then closing an electric circuit which causes the activation of a belt tightener or inflation of airbags.

Particular importance is attributed to protection in the event of a lateral collision, since there is insufficient space to provide a satisfactory path for energy-absorbing vehicle deformation in the region of sidewalls and/or doors, in contrast to the vehicle's front or rear area. Accleration sensors arranged to detect lateral collisions must respond very quickly so that the corresponding occupant safety device can become fully effective within the short period of time between the first contact of the sidewall with the obstacle and penetration of the sidewall into the passenger space. On the other hand, the electric activating circuit for the device should be designed so that it only activates the occupant safety devices if a collision which would imperil the occupants in the absence of such device actually occurs. If an acceleration sensor provided as a component of the activating circuit is located in the door of the vehicle, this means that any acceleration caused by other factors should not be effective to trigger the occupant safety device, which, in such cases, is generally a lateral airbag. Such noncollision-related accelerations are produced not only during normal operation of the vehicle, for example, by irregularities in the rolling surface, but also by forceful slamming of the door, or by the door hitting a lightpole or tree when opened. Such events may indeed produce accelerations having a magnitude which approaches those caused by collisions.

It is true that such accelerations are of very short duration, but detection of the duration of the acceleration cannot be used to differentiate such accelerations from those caused by collisions, since the time delay required for such detection would also delay the response of the occupant safety device in the event of an actual collision, with extremely harmful consequences.

SUMMARY OF THE INVENTION

Accordingly, it is an object of the present invention to provide an electric circuit for activating an occupant safety device for a vehicle which overcomes the disadvantages of the prior art.

Another object of the invention is to provide a safety device-activating circuit which does not respond to accelerations of the vehicle door, regardless of their magnitude, unless they are caused by an actual collision.

These and other objects of the invention are attained by providing a vehicle safety device-activating circuit which is disabled when the door of the vehicle is opened.

Because the invention disables the electric activating circuit during the time when the vehicle door is open, shocks and accelerations acting on the door are unable to cause the response of the occupant safety device, regardless of their magnitude. When the door is closed, the electric activating circuit is enabled, regardless of whether the engine of the vehicle is running or not. Thus, the circuit will close whenever an appropriate acceleration or deceleration of the vehicle is detected by the acceleration sensor. Consequently, the protective device provides effective protection even in the case of an impact by a moving vehicle upon a stationary vehicle (as in a traffic jam). If desired, the electric activation circuit can be interrupted by an ignition lock circuit which opens after the ignition key has been removed or by a contact coupled with a door lock, such as a central door lock control, so that the protective device will not be activated when all of the doors are locked, indicating an unoccupied vehicle.

The electric activating circuit can be advantageously designed so that, after the electric circuit has been interrupted by opening of a switch, for example, when the door is opened, restoration of the circuit is delayed slightly when the door switch is closed so that accelerations that may be generated when the door is slammed shut forcefully will in no circumstances initiate activation of the protective device. In this connection, it is a particular advantage of this aspect of the invention that it permits utilization of the door switches and also the time delay circuits which are normally used for the internal lighting system of the vehicle. In conventional automobiles, the internal lighting is frequently switched on automatically when the door is opened and, following closing of the door, the lighting is turned off after a certain time delay, for example, ten seconds. For the purpose of avoiding extra costs, the conventional arrangements provided for this purpose can be used to interrupt the electric activating circuit when the door is opened and to re-enable the electric activating circuit following a time delay after the door has been closed.

BRIEF DESCRIPTION OF THE DRAWING

Further objects and advantages of the invention will be apparent from a reading of the following description in conjunction with the accompanying drawings, in which.

DESCRIPTION OF PREFERRED EMBODIMENTS

Figure 1:
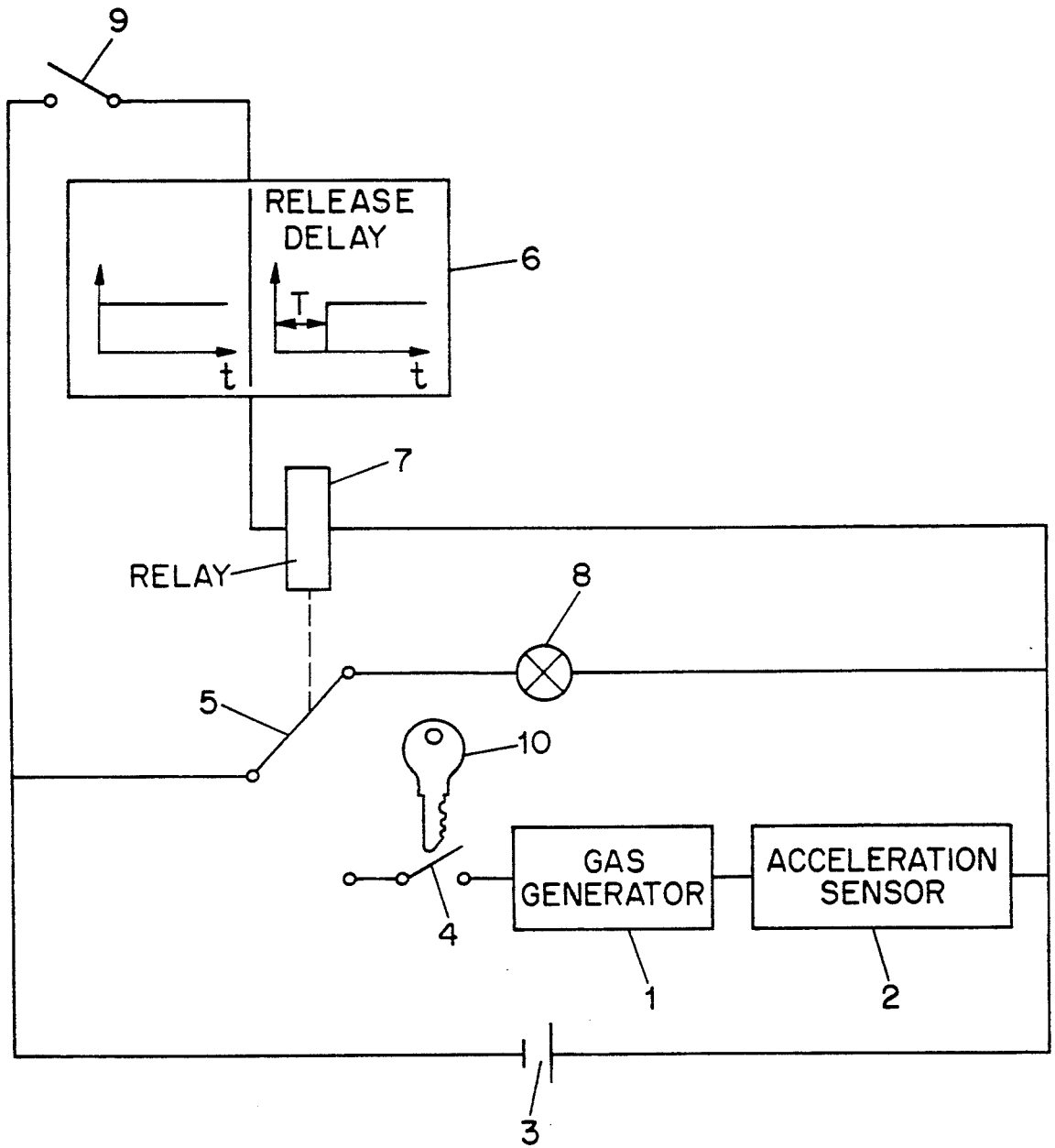
FIG. 1 is a schematic circuit diagram illustrating the arrangement of a representative embodiment of the invention.

In the typical embodiment of the invention shown in FIG. 1, a conventional gas generator 1 is arranged to supply gas upon activation to a conventional lateral airbag (not shown). Such an airbag is installed on one side of a vehicle seat, for example, in an armrest or in a door so that, in its original condition, the airbag does not take up any room in the passenger space. However, in case of a lateral collision of the vehicle, ignition of the gas generator 1 is caused by an acceleration sensor 2, leading to a rapid inflation of the airbag. Naturally, such ignition, and corresponding activation of the airbag, should only occur if an acceleration derived from a collision of predetermined force has actually been detected, and it should not occur in response to other accelerations such as those occurring when a door equipped with the acceleration sensor 2 unintentionally hits against an obstacle upon opening.

In order to make certain that this does not occur, the gas generator 1 is connected to an electric activating circuit having a voltage source 3 which is arranged so that it is enabled, that is, it can be closed in response to the acceleration sensor 2 if, and only if, a contact 4, connected to the ignition lock, is closed by the presence of the ignition key 10 in the lock and a two-position switch 5 of a relay 7 which is equipped with a release delay 6, is shifted to the other position from the one illustrated. In the illustrated position of the two-position switch 5, which corresponds to the condition of the switch when the vehicle door is open, the switch 5 supplies power to the electrical circuit for the interior light 8 of the vehicle instead of to the safety device.

Operation of the relay 7 is achieved through a door switch 9 which in the illustrated example is also the door switch used for the conventional actuation of the internal lighting 8. As shown in the box representing the release delay 6, immediately after the opening of the door, the two-position contact is shifted to the illustrated position, i.e., the electric activating circuit is interrupted. This is illustrated in the lefthand graph of the box 6 which shows the voltage condition at the switch contact connected to the lighting 8 during the time t following opening of the door. On the other hand, as seen in the righthand diagram, which shows the voltage condition at the switch contact connected to the safety device during the time t following closing of the door, the motion of the switch 5 to its other position (not shown) in which it enables the electric activating circuit, occurs with a time delay T, lasting, for example, about 10 seconds. In other words, the end of the time T following closing of the door, the turning off of the interior lighting 8, and the enabling of the electric activating circuit occurs simultaneously.

Figure 2:
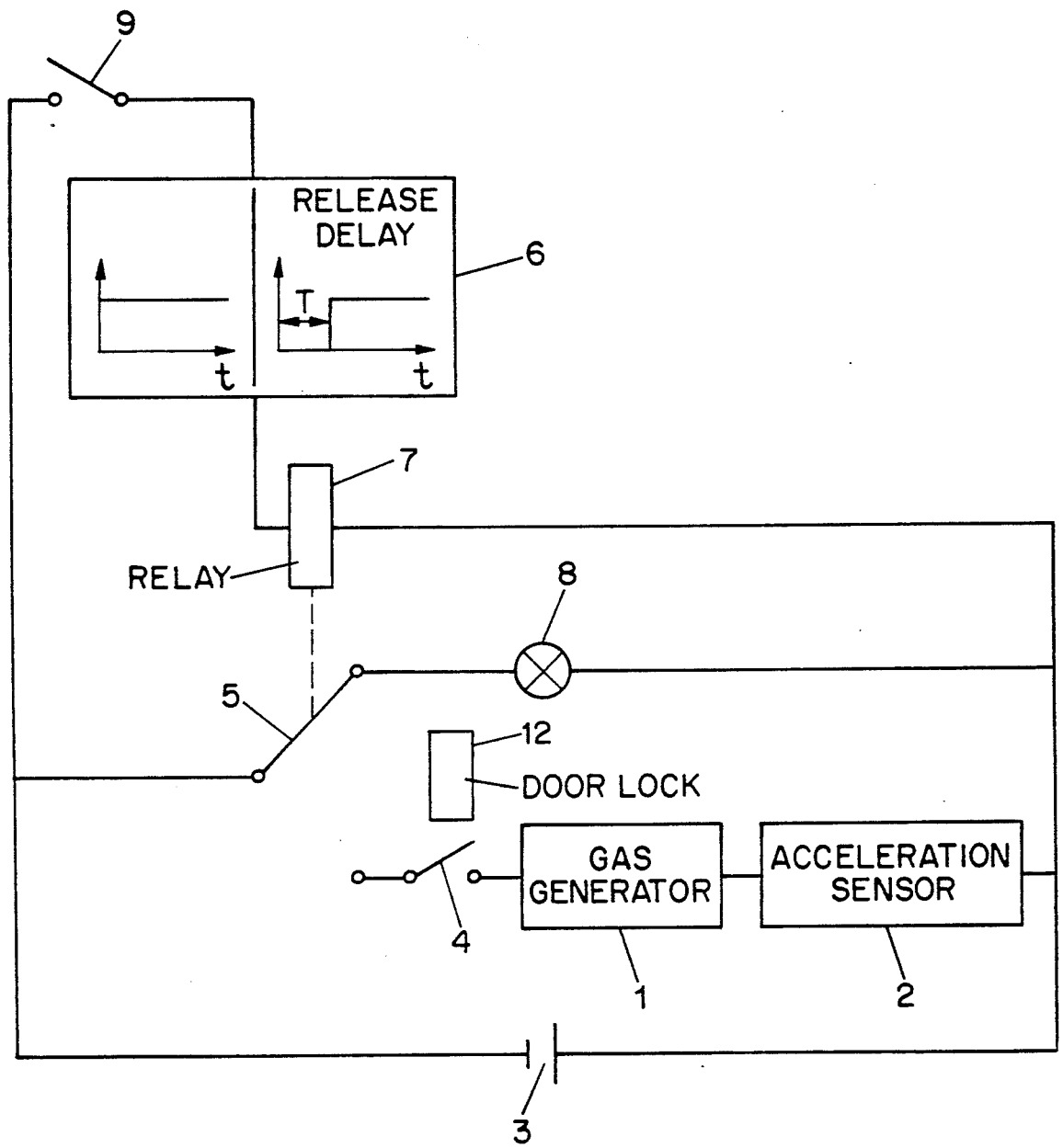
FIG. 2 is a schematic circuit diagram illustrating the arrangement of another representative embodiment of the invention.

Obviously, an additional door switch may be used rather than the lighting control switch for the operation and/or door-position-dependent interruption of the electric activating circuit. For instance, as shown in FIG. 2, the contact 4 referred to above instead of being connected to the ignition lock may be coupled to a door-locking device 12 interrupt the electrical circuit if the door is locked.

The invention thus results in a minimum-cost electric activating circuit for an occupant safety device arranged to prevent the device from being improperly ignited by acceleration which would activate an acceleration sensor but do not result from a dangerous collision. Such accelerations may occur when, for example, the door hits another object while opening or when it is subjecte to shocks in a workshop.

Although the invention has been described herein with references to specific embodiments, many modifications and variations therein will readily occur to those skilled in the art. Accordingly, all such variations and modifications are included within the intended scope of the invention.

I claim:

1. An electric circuit for an occupant safety device in a motor vehicle responsive to at least one acceleration sensor disposed in a vehicle door comprising a power source, an occupant safety device, a door-mounted acceleration sensor arranged to transmit power from the power source to the safety device in response to acceleration resulting from a collision, a door switch arranged to interrupt the electric circuit when the door is open, and delay means for delaying completion of the electric circuit after the door switch is closed, wherein the delay means comprises a relay connected to the door switch and provided with a release delay, and wherein the relay includes a two-position switch which interrupts the electric circuit for activating the safety device and closes another electrical circuit for interior lighting for the vehicle when the door is open and during the release delay of the relay.

2. An electric circuit according to claim 1 including an ignition lock contact arranged to interrupt the electric circuit when the ignition key is removed.

3. An electric circuit for an occupant safety device in a motor vehicle responsive to at least one acceleration sensor disposed in a vehicle door comprising a power source, an occupant safety device, a door-mounted acceleration sensor arranged to transmit power from the power source to the safety device in response to acceleration resulting from a collision, a door switch arranged to interrupt the electric circuit when the door is open, and a contact coupled to a door-locking device arranged to interrupt the electrical circuit if the door is locked.

* * * * *